United States Patent [19]
Demerin

[11] 3,841,186
[45] Oct. 15, 1974

[54] MACHINE FOR CUTTING MEAT JOINTS, SPECIALLY BREASTS OF PORK

[75] Inventor: Francois Demerin, Paris, France

[73] Assignee: Fabriques De Produits Alimentaires Les Fils De William Saurin, Lagny, France

[22] Filed: May 31, 1973

[21] Appl. No.: 365,586

[30] Foreign Application Priority Data
June 2, 1972  France .............................. 72.19953

[52] U.S. Cl.................... 83/404.2, 83/408, 83/425.4
[51] Int. Cl.............................................. B26d 7/06
[58] Field of Search .... 83/404.1, 404.2, 408, 425.1, 83/425.2, 425.3, 425.4

[56] References Cited
UNITED STATES PATENTS
1,919,964  7/1933  Spang .......................... 83/404.1 X
3,478,397  11/1969  Pearne et al. ...................... 83/408 X Primary Examiner—Willie G. Abercrombie

[57] ABSTRACT

A machine for cutting a meat joint having a thickness decreasing from one end to the other into pieces of substantially equal weight. The meat joint, such as a breast of pork, is fed against a row of equally spaced cutters and cut thereby into strips. An inclined plate stops these strips in positions depending on the thickness of their respective thinner ends. After raising the plate, a push member pushes the strips towards another row of cutters which are spaced relative to each other so as to cut pieces of same equal volume and weight from said strips. This machine is intended specially for the food industry and the preparation of canned food.

16 Claims, 6 Drawing Figures

MACHINE FOR CUTTING MEAT JOINTS, SPECIALLY BREASTS OF PORK

BACKGROUND OF THE INVENTION

The present invention relates to machines for cutting meat in general and has specific reference to a machine for cutting a meat joint, notably a breast of pork, into pieces having all substantially the same weight.

Machines designed and constructed for cutting meat joints having a substantially equal thickness from one end to the other into pieces having substantially the same weights and more particularly a nearly parallelipipedic shape, are already known. These known machines cannot be used for cutting meat joints, for example a breast, the thickness of which decreases from one end to the other, since it would be cut only into pieces having the same width and the same length, but different thicknesses, and consequently variable weights.

SUMMARY OF THE INVENTION

A first object of this invention is to provide a machine capable of cutting into pieces of substantially equal weight, a meat joint having a thickness decreasing from one end to the other, notably breasts of pork. A second object of this invention is to provide a machine comprising, on a first side of a substantially rectangular table a first row of cutters arranged in spaced relationship, through which the breast to be cut is fed with its small end first, on said table, so as to cut the meat joint into strips having substantially the same width, an inclined plate on said table, which slopes downwardly towards the edge opposite to said first side, so as to stop the cut strips of meat sliding on said table in positions depending respectively on the thicknesses of their small ends, respectively, a second row of cutters disposed on a second side of said table, adjacent to said first side, and means for pushing the strips of meat previously stopped by said plate towards said second row of cutters, the relative spacing of said second row of cutters being selected to cut from said strips pieces of meat of variable dimensions but having nearly all the same volume and weight.

In a preferred embodiment of the machine according to this invention the table is disposed horizontally, the plate is movably mounted above said table and means are provided for moving said plate from a first position for stopping the cut strips of meat to a second position, in which the plate is raised above the thus stopped meat strips. In this specific embodiment, a push member substantially parallel to, and of the same length as the second row of cutters, is mounted to the table side opposite to said second side thereof, and means such as a horizontally acting fluid-operated cylinder and piston unit (hereinafter referred to as a "ram") is provided for moving said push member from a retracted position adjacent to the plate edge opposite to said second row of cutters, to a position close to said second row of cutters, to which said push member is brought when said plate is in its second raised position. On the other hand, said plate comprises at least one member for guiding the cut strips of meat, said guide member being so arranged as to be raised when said plate is moved to its second raised position, it being in the form of a blade movable in a slot formed in said plate, for example under the control of a ram carried by said plate. An endless belt conveyor is mounted to said table beneath said plate for transferring the cut strips of meat towards said second row of cutters. In this preferred embodiment of the invention the loading station of the machine comprises a horizontal tray adjacent to said first side of the table, a pair of movable members for positioning the breast, when the latter is laid down on said tray, in relation to the first row of cutters, and means for adjusting the positions of said pair of positioning members in relation to the first and last cutters, respectively, of said first row; preferably, the first breast positioning member is driven by means of a motor, for example a hydraulic ram, for pressing or ramming the breast against the second positioning member before the breast being fed through said first row of cutters.

The machine according to this invention is advantageously provided with a sequential control device adapted to be started by a switch responsive to the breast being laid on the loading tray, for controlling the following cycle of operations:

a. moving the first positioning member for ramming the breast laid down on the tray against the second positioning member;

b. lowering successively a plurality of guide blades, said plurality being adapted to the final position of the first positioning member;

c. after manually feeding the breast through the first row of cutters and after a first suitable time-lag, raising the guide blades and the plates;

d. moving the push member towards the second row of cutters and starting the endless belt conveyor;

e. after a second adequate time-lag, returning the push member to its retracted position, stopping the belt conveyor and lowering the plate.

The machine according to this invention can be used also for cutting plate-shaped bodies of any material and variable thickness into pieces having substantially equal volumes and weights; however, this machine is intended primarily for the food industry, for cutting meat joints, notably pork breasts, into pieces having the same weights, thus facilitating proportioning of the various ingredients utilized for preparing canned food, such as sauerkraut with sausages, etc.

BRIEF DESCRIPTION OF THE DRAWING

A typical embodiment of the machine according to this invention will now be described by way of example with reference to the accompanying drawings, in which.

DESCRIPTION OF THE PREFERRED EMBODIMENT

Figure 1:
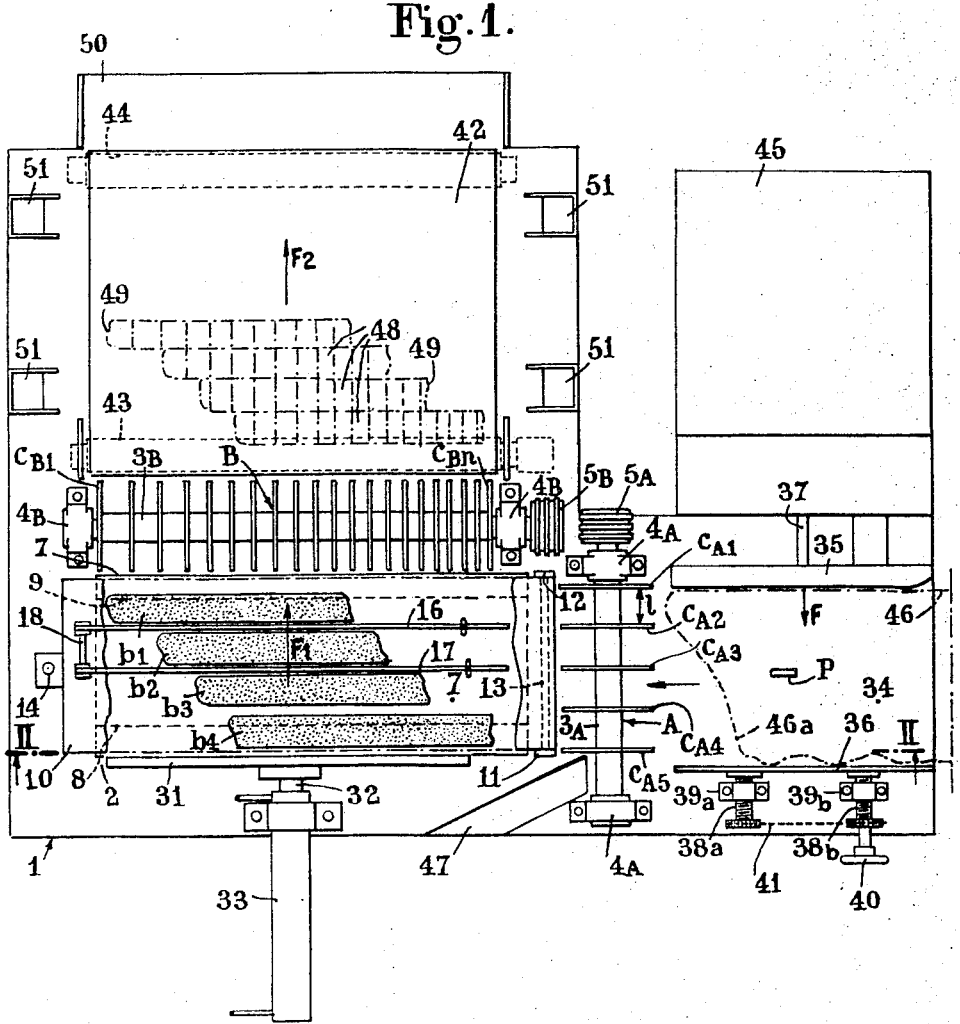
FIG. 1 is a diagrammatic plan view of the machine with parts broken away.
Figure 2:
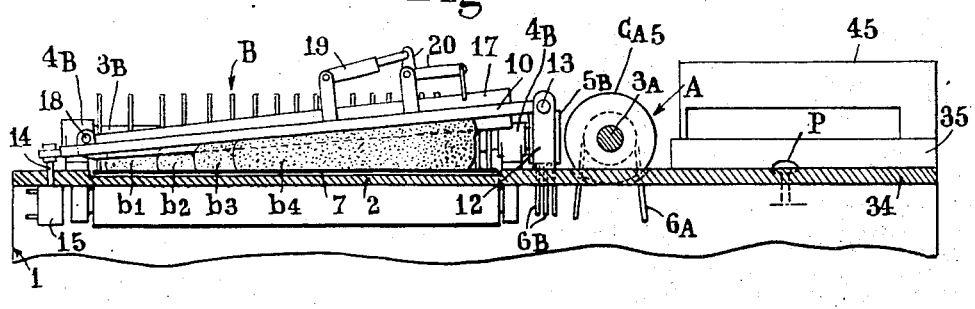
FIG. 2 is a section taken along the line II—II of FIG. 1.

The machine illustrated in FIGS. 1 and 2 of the drawings comprises essentially a frame structure 1 having a substantially L-shaped configuration in plan view; this frame structure 1 supports a horizontal rectangular table or bed 2 having mounted thereto, on two adjacent sides, first and second rows of cutters A and B respectively. In the form of the embodiment illustrated, each one of the two rows of cutters A and B comprises a series of circular or disc cutters $c_{A1}$ to $c_{A5}$, or $c_{B1}$ to $c_{Bn}$, rigidly secured to a common shaft 3A or 3B, rotatably mounted in turn by means of bearings 4A or 4B on the corresponding side of table 2, said shaft being operatively connected at one end to a separate motor; in the example illustrated the adjacent ends of the two shafts 3A and 3B carry multiple-groove pulleys 5A and 5B rotatably driven through the intervention of endless transmission belts 6A, 6B, preferably at different speeds, by at least one motor and reduction gearing unit (not shown); the cutters of the first row A rotate preferably at a considerably higher speed than the cutters of the second row B. Whereas the five cutters of the first row A are equally spaced from one another, the gaps between the cutters of the second row B decrease gradually from left to right, as seen in FIGS. 1 and 2, according to a law to be explained presently.

An endless conveyor belt 7 is mounted with its upper span atop the table 2 by means of guide rollers 8 and 9 (FIG. 1); this conveyor belt is arranged to cover a rectangular surface having one small side and one adjacent major side disposed close to the edges of the circular cutters of the two rows A and B, respectively, and parallel to their respective shafts 3A and 3B; power means of known type (not shown) and therefore not described in detail are provided for imparting at will a uniform linear motion to the belt conveyor 7 in the direction of the arrow F1 (FIG. 1).

A rectangular plate 10 is mounted to the table 2 above the conveyor belt 7 as follows: the edge of this plate 10 which is adjacent to the first row of cutters A is pivoted to support means 11 and 12 about a shaft 13 extending substantially horizontally and parallel to the shaft 3A; the edge of plate 10 which is opposite to its side pivoted about this shaft 13 is operatively connected to the piston rod 14 of a hydraulic or pneumatic cylinder or ram 15 carried in turn by said table 2; the dimensions of the component elements of this assembly are such that the cylinder 15, when de-energized, keeps the plate 10 in a first position, shown in FIG. 2, in which it is inclined in the direction away from the first row of cutters A, said cylinder 15, when energized with fluid under pressure, being adapted to lift the free end of the pivoting plate 10 until it attains a second or so-called released position in which it extends substantially horizontally and parallel to said table 2. Preferably, well-known means (and therefore not described or illustrated in detail herein) are provided for adjusting at will the inclination of plate 10 in its first position in order to adapt same to the shape of the meat joint to be cut, as will be explained more in detail presently.

Figure 5:
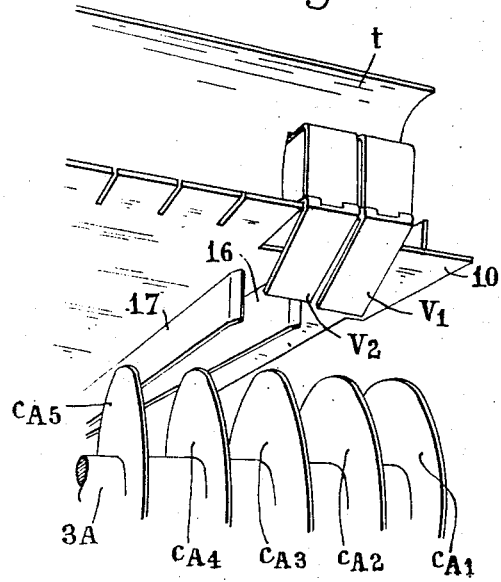
FIGS. 5 and 6 illustrate in perspective view an improvement to the machine of FIGS. 1 and 2.
Figure 6:
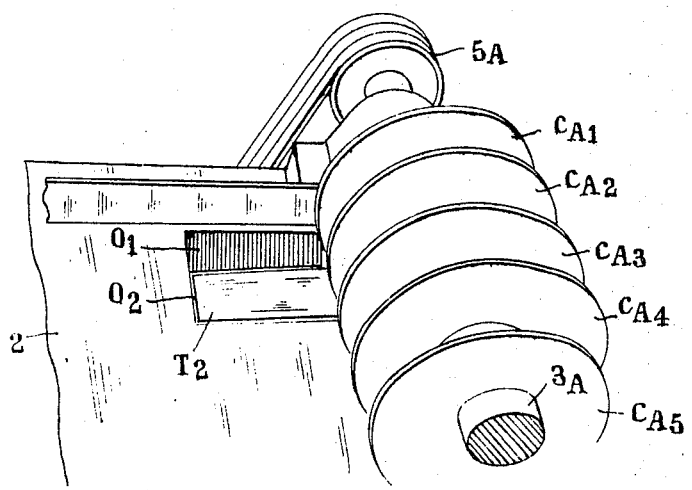

In the embodiment illustrated and contemplated herein, the plate 10 comprises, registering with the cutters $c_{A2}$ and $c_{A3}$ of the first row A, a pair of slots parallel to the shaft 3B of the second row of cutters B, said slots having pivotally mounted therein a pair of guide blades 16, 17 pivoted to a common pivot pin 18; the plate 10 further carries a pair of hydraulic or pneumatic cylinders or rams such as 19, having their piston-rods operatively connected via a cranked lever such as 20 to one of the pivoting blades 16 or 17, respectively, so that the relevant blade can project above the plate 10 when the piston-rod of ram 19 is moved outwards, as shown in FIG. 2, while said blade 17 is raised in relation to the plate 10 when the piston-rod of cylinder 19 is retracted. These guide blades 16 and 17 are also visible in FIG. 5 showing likewise the following optional improvements of the machine shown in FIGS. 1 and 2: $t$ designates a bent sheet-metal cover or plate secured to the edge of the pivoting plate 10 which registers with the first row of rotary cutters $c_{A1}$ to $c_{A5}$, in order to stop the strips thrown by said rotary cutters when said plate 10 is in its first position, i.e., the lowest position; $V_1$ and $V_2$ designate a pair of retractable shutters pivoted to horizontal shafts along the edge of plate 10, beneath the sheet-metal bent plate $t$, so that when said plate 10 is in its first or lowest position the strips of meat cut by cutters $c_{A2}$ and $c_{A3}$, or at least that one of these two strips which may possibly be incomplete, can be blocked, as will be explained more in detail presently. FIG. 6 illustrates the provision of apertures $O_1$ and $O_2$ formed in said table 2, ahead of the pairs of cutters $c_{A1} - c_{A2}$ and $c_{A2} - c_{A3}$, respectively, for discharging the strips of meat intercepted by said shutters $V_1$ and $V_2$, the aperture $O_2$ being adapted to be shut at will by means of a collapsible bottom plate $T_2$. The pivoting shutters $V_1$, $V_2$ and collapsible bottom plate $T_2$ are controlled for example by hydraulic or pneumatic rams or cylinders (not shown), carried by the plate 10 and table 2, respectively.

The side of table 2 opposite the other row of cutters B carries on the other hand a push member, for example in the form of a plate 31, having substantially the same length as the second row of cutters B and this plate 31 is movable parallel to itself and bodily with the end of the piston rod 32 of another hydraulic or pneumatic cylinder 33 secured likewise to this side of table 2; the arrangement of this assembly is such that when the piston rod 32 is retracted, the push member 31 is inoperative with respect to the relevant edge of plate 2 then in its first inclined position as shown in FIG. 2; the outward movement of this piston-rod 32 of cylinder 33 (which, as will be explained presently, is permitted only when the pivoting plate 10 and the pivoting guide blades 16, 17 are raised) will cause the movement of push member 31 parallel to itself to an end position adjacent the edges of the circular cutters of the second row B.

The frame structure 1 also carries on the right-hand side of table 2 (as seen in FIGS. 1 and 2) a loading station comprising essentially a horizontal tray 34 adjacent the table 2 of which it constitutes an extension beyond the first row of cutters A, as well as first and second positioning members 35 and 36 constituted as follows, respectively: the first positioning member 35 comprises essentially a thick buffer plate perpendicular to the shaft 3A of the first row of cutters and carried by the piston rod 37 of a hydraulic or pneumatic cylinder (not shown), permitting of adjusting the position of said thick buffer plate 35 in relation to said first cutters $c_{A1}$ and $c_{A2}$ of the first row A; the second positioning member 36 consists essentially of a plate parallel to said buffer plate 35 and supported by a pair of screw-threaded rods 38$a$ and 38$b$ adapted to rotate freely in bearings 39$a$ and 39$b$ secured to the corresponding side of said tray 34; in the exemplary form of embodiment illustrated, a handwheel 40 keyed to the free or outer end of screw rod 38$b$, and a chain transmission 41 permit of adjusting at will the position of plate 36 in relation to the last cutters $c_{A4}$ and $c_{A5}$ of said first row A.

Finally, the frame structure 1 comprises an unloading or discharge station consisting essentially of a horizontal belt conveyor 42 guided by rollers 43 and 44; the input edge of this unloading belt conveyor 42, corresponding to the guide roller 43 thereof, is adjacent to the edges of the cutters constituting the second row B, and power means, also known per se and not shown, are provided for imparting a uniform linear motion to this discharge belt conveyor 42 in the direction of the arrow F2 (FIG. 1).

Figure 3:
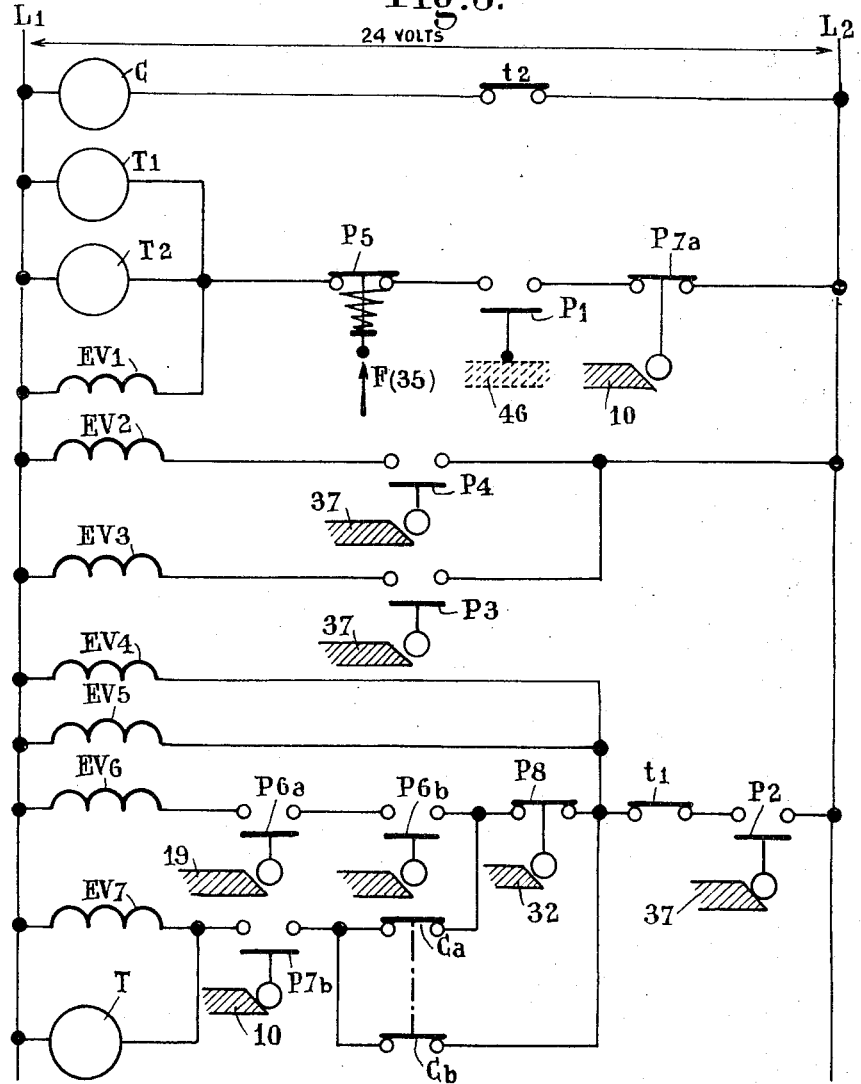
FIG. 3 is the wiring diagram of the sequential control device comprised in the machine illustrated in FIGS. 1 and 2.

A cabinet 45 associated with the portion of frame structure 1 that carries the loading tray 34 encloses the sequential control device of the machine of which the wiring diagram is shown in FIG. 3; this device comprises, between two electric mains supply lines, for example a 24-Volt two-wire system, L1 and L2, the following component elements:

a pair of relay coils $T_1$ and $T_2$, adapted to resume their inoperative or de-energized condition with time-lags corresponding substantially to one-half for one coil in relation to the other; these two relay coils $T_1$ and $T_2$ are connected in parallel with each other and in series with the following elements: a back contact $P_5$ opening only when a predetermined threshold is overstepped by the ramming force F exerted on the breast (shown at 46 in dash-and-dot lines in FIG. 1 and carried by the tray 34) by the thick plate 35 pushed by the piston-rod 37; a front contact $P_1$ of a switch P mounted to the loading tray 34 (FIG. 1) so as to be actuated by the breast 46 supported by said tray 34; and a back contact $P_{7a}$ actuated by the pivoting table 10 when the latter is in its raised podition;

a relay coil C in series with the back contact $t_2$ of relay $T_2$;

the control winding $EV_1$ connected in parallel to the relay coils $T_1$ and $T_2$ of a solenoid-operated valve controlling the supply of fluid to the ram or cylinder actuating the thick plate 35 (FIG. 1);

control windings $EV_2$ and $EV_3$ of the solenoid-operated valve controlling the supply of fluid to rams such as 19 for moving their piston-rods to their outer or operative positions, respectively, and thus lower the guide blades 16 and 17, respectively. These two windings $EV_2$ and $EV_3$ are connected in series, respectively, with front contacts $P_4$ and $P_3$ actuated for example by means of the piston-rod 37 of the cylinder controlling the thick plate 35, i.e., for different widths of the breast 46 supported by the tray 34;

control windings $EV_3$ and $EV_5$ of solenoid-operated valve controlling the supply of fluid to rams such as 19 in order to retract their piston-rods and consequently raise the pivoting guide blades 16 and 17; the two control windings $EV_4$ and $EV_5$ are connected in parallel to each other and in series with a back contact $t_1$ of relay $T_1$, and also with a front contact $P_2$ actuated for example by the rod 37 of the ram actuating the thick buffer plate 35 only when this plate 35 is in its position remotest from the opposite edge of tray 34;

the control windings $EV_6$ and $EV_7$ of solenoid-operated valves controlling the supply of fluid to rams 15 and 33, respectively; the control windings $EV_6$ (connected in parallel to the windings $EV_4$ and $EV_5$) is connected in series with a pair of front contacts $P_{6a}$ and $P_{6b}$ actuated for instance by piston-rods of rams, such as 19, only when these are fully retracted so that the guide blades 16 and 17 are fully raised; a back contact $P_8$ actuated for example by the rod 32 of cylinder 33 only when the push member 31 is in its retracted position shown in FIG. 1; the winding $EV_7$, connected in parallel to $EV_6$, $P_{8a}$ and $P_{8b}$, (in series with one another, is connected in series with front contact $P_{7b}$ closed only when the plate 10 is in its raised position, and also with a first back contact $C_a$ of relay C, of which a second back contact $C_b$ is mounted in parallel to contacts $C_a$ and $P_8$;

the coil T connected in parallel to the winding $EV_7$ of a contactor adapted to close the energizing circuit of the driving motor (not shown) of belt conveyor 7.

The above-described machine operates as follows:

The two rows of rotary cutters A and B rotate continuously when the main switch controlling the machine (not shown) is in its ON position; the same applies to the means (not shown) driving the discharge belt conveyor 42. When for example a pork breast 46 is laid upon the loading tray 34 in the position shown in dash-and-dot-lines in FIG. 1, it actuates the switch P of which the front contact $P_1$ closes the energizing circuit of $T_1$, $T_2$ and $EV_1$. As a consequence of the energization of the control winding $EV_1$ the piston-rod 37 of the corresponding cylinder begins to push the thick buffer plate 35 towards the nearest edge of the breast 46 supported by said tray 34. When the thick buffer plate 35 is substantially level with the first cutter $c_{A1}$ of the first row A, the piston-rod 37 of the fluid-actuated cylinder closes the contact $P_4$ so that the control winding $EV_2$ is energized and a ram corresponding to 19 (FIG. 2) causes the guide blade 16 to pivot downwards, so that it projects from the underface of the pivoting plate 10. If the breast 46 is relatively wide, the ramming force F exerted by the plate 35 against its edge will exceed the predetermined threshold very shortly afterwards, so that the contact $P_5$ will operate to open the energizing circuit of $T_1$, $T_2$ and $EV_1$ and thus stop the forward movement of buffer plate 35. On the other hand, in the case of a narrower breast the forward movement of buffer plate 35 is continued and the ramming force F remains below its predetermined threshold, and when this buffer plate 35 is substantially level with the second cutter $c_{A2}$ of the first row A, the rod 37 closes the contact $P_3$, thus energizing the control winding $EV_3$ through the corresponding circuit, whereby the ram 19 will cause the guide blade 17 to pivot and project from beneath the pivoting plate 10; it is only afterwards that the ramming force F exerted by the buffer plate 35 oversteps the predetermined threshold and the consequent opening of contact $P_5$ opens the energizing circuit of $T_1$, $T_2$ and $EV_1$, thus stopping the progression of buffer plate 35 and starting the delay actions controlling the returns to the inoperative position, i.e., the closing of contacts $t_1$, $t_2$ of relays $T_1$, $T_2$. Then the operator pushes manually the breast 46 carried by the tray 34 towards the first row of cutters A of which the rotary cutters will at the same time transfer this breast 46 from the tray 34 to the table 2, and cut said breast 46 into strips $b_1$ to $b_4$ of same width; simultaneously, the corresponding ram begins to return the buffer plate 35 to the rear, i.e., to its inoperative position; although contact P5 is then reclosed again, the energizing circuit of $T_1$, $T_2$ and $EV_1$ is not restored due to the re-opening of contact $P_1$ when the corresponding switch P is released by the breast 46 moving away from the tray 34. Then the backward movement of piston rod 37 will open in succession the contacts $P_3$ and $P_4$, thus opening the energizing circuits of control windings $EV_2$ and $EV_3$ of the corresponding solenoid-operated valves. However, the guide blades 16 and 17 keep projecting from beneath the pivoting plate 10 so as to guide the strips of cut meat $b_1$ to $b_3$ during their forward movement under said plate 10. As shown in FIGS. 1 and 2, this plate 10 stops the strips of cut meat $b_1$ to $b_4$ in particular positions depending notably on the thicknesses of their small ends, which vary inasmuch as, as shown in dash-and-dot lines in FIG. 1, the small end 46a of breast 46 which is engaged first through the first row of cutters A is substantially wedge-shaped, so that its thickness increases from the edge of the breast 46 which is adjacent the buffer plate 35 to the edge adjacent the plate 36. In fact, this last-mentioned edge is also irregular and before laying said breast 46 upon the loading tray 34 the position of plate 36 is adjusted by means of the handwheel 40 so that this same irregular edge lies beyond the last cutter $c_{A5}$ of the first row A, towards the bearing 4A, whereby, when the breast 46 is pushed through the first row of cutters A, its irregular edge is separated from the strip $b_4$ by cutter $c_{A5}$ and subsequently discharged through a lateral chute 47 opening for example above a carriage for the disposal of waste.

When the rod 37 has restored the buffer plate 35 to its inoperative position it closes the contact $P_2$. It is only thereafter that at the end of its time-lag the contact $t_1$ of relay $T_1$ is closed to energize the circuits of control windings $EV_4$ and $EV_5$, the corresponding solenoid-operated valve thus supplying fluid under pressure to rams such as 19 for pivoting the guide blades 16 and 17 upwards so that they do not project beneath the pivoting plate 10. When these guide blades 16 and 17 are fully raised, the piston-rods of the corresponding rams, such as 19, close contacts $P_{6a}$ and $P_{6b}$, respectively, thus closing the energizing circuit of control winding $EV_6$ of which the solenoid-operated valve controls the supply of fluid under pressure to ram 15, whereby the rod 14 of this ram will raise the pivoting plate 10 to its upper position in which it lies substantially parallel to the table 2. An element of plate 10 is then adapted to open contact $P_{7a}$ (thus enabling the operator to lay another breast upon the tray 34, without causing the contact $P_1$ alone to restore the energizing circuit of $T_1$, $T_2$ and $EV_1$) and close contact $P_{7b}$ energizing the circuits of control winding $EV_7$ and contactor coil T; the solenoid-operated valve responsive to the winding $EV_7$ will then supply fluid to ram 33 whereby the piston-rod 32 of this ram 33 will begin to actuate the push member 31 from its retracted position (FIG. 1) in the direction of the arrow $F_1$ while the closing of contactor T will start the operation of conveyor belt 7. The combined action of belt conveyor 7 and push member 31 (which can now move freely under the plate 10 in its raised position), together with the action of guide blades 16 and 17, causes the cut strips of meat $b_1$ to $b_4$ to be fed successively under the rotary cutters of the second row B, by which said strips are cut in the transverse direction into pieces such as 48 (FIG. 1) having each a length substantially equal to the gap measured between any pair of adjacent cutters of row B having cut the strips, except the pieces cut from the end strips $b_1$ and $b_4$, such as 49, of which the length is not sufficient. All these pieces are transferred, beyond the second row of cutters B, by the belt conveyor 42 towards a discharge shoot 50 opening for example above a carriage. Operators disposed on either side of the belt conveyor 42 remove manually the incomplete pieces such as 49 and throw them into other shoots 51 leading to other waste disposal carriages.

Only then can the contact $t_2$ of relay $T_2$, which has a delay-action or time-lag about twice that of contact $t_1$ of relay $T_1$, be re-closed, thus energizing the circuit of relay C and causing the latter to open its contacts $C_a$ and $C_b$, to energize the circuits of $EV_7$ and T, respectively; the solenoid-operated valve controlled by the winding $EV_7$ then controls the energization of ram 33 so that its piston rod 32 restores the push member 31 to its retracted position shown in FIG. 1, while the opening of contactor T stops immediately the belt conveyor 7. When the push member 31 has attained its retracted position, the piston-rod 32 opens contact $P_8$ and de-energizes the control winding $EV_6$, the corresponding solenoid-operated valve controlling the supply of fluid to ram 15 whereby its piston-rod 14 restores the pivoting plate 10 to its inclined position, contact $P_{7b}$ being opened again and contact $P_{7a}$ re-closed so that, in case a fresh breast were laid upon the tray 34, $T_1$, $T_2$ and $EV_1$ are re-energized for starting another cycle of operation of the machine.

Figure 4:
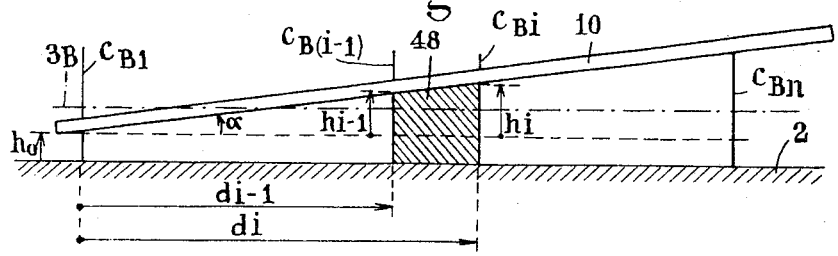
FIG. 4 is a diagram illustrating the principle of operation of the machine according to this invention.

In the diagram of FIG. 4 the hatched portion corresponds to a piece of meat 48 cut from anyone of the strips $b_1$ to $b_4$ by the $(i-l)^{th}$ and the $i^{th}$ cutter of the second row B, which are denoted $c_B(i-l)$ and $c_{Bi}$, respectively. If $\alpha$ is the angle of inclination of plate 10 in its first position, and $h_0$ the minimum vertical distance between the plate 10 and table 2, $d$ being the mean density of the meat and $l$ the width of each cut strip of meat $b_1$ to $b_4$, i.e., substantially the gap between any pair of adjacent and equally spaced cutters of the first row A, the weight P of this piece of meat 48 is given by the following relationship:

$$P = (d_i - d_{i-1}) \cdot (h_i + h_{i-1}/2 + h_o) \cdot l \cdot d,$$

(1)

with reference to FIG. 4.
Since:

$$h_{i-1} = d_{i-1} \cdot tg\ \alpha \quad h_i = d_i \cdot tg\ \alpha$$

(2)

the relationship (1) hereinabove can be expressed as follows:

$$P = (d_i - d_{i-1}) \cdot [(d_i + d_{i-1})\ tg\ \alpha/2 + h_o] \cdot l \cdot d \cdot$$

(3)

From the above relationship (3) it will be seen that to cut pieces having substantially the weight P, the second row of cutters B of the machine according to this invention should preferably be so dimensioned that the distance $d_i$ from its $i^{th}$ cutter, $c_{Bi}$, to its first cutter $c_{B1}$ is selected to be substantially equal to the positive root of the following equation:

$$tg\ \alpha/2 \cdot d_i^2 + h_o \cdot d_i - (tg\ \alpha/2 \cdot d_{i-1}^2 + h_o \cdot d_{i-1} + P/d \cdot l) = 0$$

(4)

wherein $d_{i-1}$ is the distance from the $(i-1)^{th}$ cutter $c_B(i-1)$ of the second row to its first cutter $c_{B1}$.

In the improved embodiment shown in FIGS. 5 and 6, at the beginning of each cycle of operation of the machine the shutters $V_1$ and $V_2$ are retracted, and the bottom plate $T_2$ is closed; the downward movement of shutters $V_1$ and $V_2$ to their operative or interception position is controlled by their separate and respective rams, in conjunction with the downward movement of guide blades 16 and 17, controlled respectively by their separate rams, such as 19 (FIG. 2); in other words, the supply of fluid under pressure to the rams actuating these shutters $V_1$ and $V_2$ may be controlled by means of the aforesaid solenoid-operated valves having their driving windings designated by the reference symbols $EV_2$ to $EV_4$ and $EV_2$ to $EV_5$, respectively, in FIG. 3; as to the opening of the bottom plate $T_2$ it is controlled at the same time as the downward movement of shutter $V_2$. With this arrangement, the first strip, possibly incomplete, cut from the breast 46 by one of the cutters $C_{A2}$ and $C_{A3}$, according to the width of said breast 46, is positively intercepted by the corresponding shutter $V_1$ or $V_2$ and discharged through the corresponding orifice $0_1$ or $0_2$.

Many modifications and variations may be made in the above-described machine, as will readily occur to those conversant with the art, without departing from the scope of the invention. Thus, each row of rotary cutters A and B may be replaced with a row of non-rotary cutters or knives, for example vibrating knives. The pivoting plate 10 may be replaced with a plate guided vertically for translation from a lower to an upper position and vice-versa. The endless belt conveyor 7 is optional, and the push member 31 may be embodied in many different forms differing from the one contemplated hereinabove. The guide members 16 and 17 may also be constructed in various ways. The loading station shown in the form of a tray 34 and the positioning members 35 and 36, as well as the unloading or discharge station, consisting in this example of the conveyor belt 42, may also be modified in many different ways. On the other hand, the table 2 is not necessarily horizontal; thus it may be inclined in the direction opposite to its first side, or even disposed vertically, the first row of cutters being mounted in this case along its upper side. The plate 10 proper may be mounted in a fixed and inclined relationship to the table 2, provided that the push member 31 be so arranged that it can be moved in a piston-like fashion in the gap between the table 2 and the plate 10. The driving and transmission means associated with the various component elements of the machine are also liable to various modifications and may be constructed in different versions, such as hydraulic, pneumatic, electro-mechanical, etc., without departing from the scope of the invention.

Neither is the present invention limited to a specific embodiment of the sequential control device, specially to the electromechanical embodiment illustrated in FIG. 3; in fact, the sequential control device of the machine according to the present invention may be constructed in many different ways, especially comprising electronic components.

What I claim is:

1. Machine for cutting a joint of meat of substantially elongated configuration, having a first, relatively thick end and a second, relatively thin end, into a plurality of pieces of substantially equal weight, comprising: a substantially rectangular table, a first row of substantially equally spaced parallel cutters on a first side of said table, through which said second end of said joint of meat is fed for cutting the same into strips having substantially the same width, a plate mounted to said table in an inclined position and sloping downwardly in a direction away from said first side of said table for stopping the cut strips of meat on said table in respective positions depending on the thickness of the respective second ends of said meat strips, a second row of cutters disposed on a second side of said table which is adjacent to said first side, and means for pushing the strips of meat stopped by said plate towards said second row of cutters, the cutters of said second row of cutters being spaced unequally, with the spaces between cutters being determined mathematically so as to cut said strips into pieces of meat having different lengths but substantially the same volume and weight.

2. Machine as set forth in claim 1, wherein said table is horizontal, said plate is movably mounted above said table, and means being provided for moving said plate from a first position, in which said plate is adapted to stop said cut strips of meat to a second position, in which said plate is raised above the thus stopped strips of meat.

3. Machine as set forth in claim 2, wherein a first edge of said plate, adjacent to said first side of said table, is pivotally mounted to said table about a substantially horizontal axis, and a lifting motor carried by said table and coupled to a second edge of said plate opposite to said first edge.

4. Machine as set forth in claim 2, further comprising means for adjusting the inclination of said plate in its first position.

5. Machine as set forth in claim 1, wherein each of said two rows of cutters comprises a series of circular cutters, a common shaft having keyed thereto the respective series and being rotatably mounted to the respective side of said table, and motor means respectively operatively connected to said shafts.

6. Machine as set forth in claim 1, comprising: a push member substantially parallel to, and of same length as, said second row of cutters and arranged on that side of said table which is opposite to said second side thereof, and means for moving said push member from a first position adjacent to the edge of said plate opposite to said second row of cutters, to a second position adjacent to said second row of cutters.

7. Machine as set forth in claim 1, wherein at least one member for guiding the strips of meat cut by said first row of cutters is movably mounted beneath said plate, and means for retracting said guide member when said strips of meat are pushed towards said second row of cutters.

8. Machine as set forth in claim 7, wherein each member for guiding the strips of meat cut by said first row of cutters comprises a blade movable in a slot formed in said plate, and a ram connected to said plate for retracting said blade.

9. Machine as set forth in claim 1, comprising an endless belt conveyor mounted to said table beneath said plate for conveying the strips of meat cut by said first row of cutters, towards said second row of cutters.

10. Machine as set forth in claim 1, comprising a loading station including a horizontal tray adjacent said first side of said table, a pair of members for positioning said meat joint laid down on said tray in relation to said first row of cutters, and means for adjusting the positions of said pair of positioning members in relation to the first and last cutters of said first row, respectively.

11. Machine as set forth in claim 10, comprising motor means for moving said first positioning member to thereby move said meat joint against said second positioning member before feeding said meat joint through said first row of cutters.

12. Machine as set forth in claim 1, comprising means for automatically discharging a partial strip cut from said meat joint by the outermost cutter of said first row.

13. Machine as set forth in claim 1, comprising an unloading station including a horizontal belt conveyor having its input end adjacent to said second side of said table.

14. Machine as set forth in claim 11, comprising means for sensing a meat joint laid on said loading tray, and a sequential control unit responsive to said sensing means for controlling said motor means according to a predetermined cycle of operations.

15. Machine as set forth in claim 1, wherein said plate comprises at least one movable shutter in front of the outermost cutters of said first row and adapted to intercept a partial strip of meat cut by said first cutters, motor means for retracting said shutter, and an orifice in said table for discharging said partial strip of meat, said orifice being located between said outermost cutters and said shutter.

16. Machine as set forth in claim 15, comprising a retractable bottom plate for closing said discharge orifice, and motor means for controlling the retraction of said bottom plate.

* * * * *